(12) United States Patent
Kim et al.

(10) Patent No.: US 10,341,674 B2
(45) Date of Patent: Jul. 2, 2019

(54) METHOD AND DEVICE FOR DISTRIBUTING LOAD ACCORDING TO CHARACTERISTIC OF FRAME

(71) Applicant: SAMSUNG ELECTRONICS CO., LTD., Suwon-si (KR)

(72) Inventors: Min-soo Kim, Yongin-si (KR); Sang-jo Lee, Suwon-si (KR); Do-hyung Kim, Hwaseong-si (KR); Joon-ho Song, Hwaseong-si (KR); Si-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 255 days.

(21) Appl. No.: 15/089,967

(22) Filed: Apr. 4, 2016

(65) Prior Publication Data
US 2016/0219285 A1 Jul. 28, 2016

Related U.S. Application Data

(63) Continuation of application No. PCT/KR2014/009284, filed on Oct. 1, 2014.

(30) Foreign Application Priority Data

Oct. 4, 2013 (KR) .................... 10-2013-0118731

(51) Int. Cl.
*H04N 19/436* (2014.01)
*H04N 19/172* (2014.01)
(Continued)

(52) U.S. Cl.
CPC ......... *H04N 19/436* (2014.11); *H04N 19/127* (2014.11); *H04N 19/139* (2014.11);
(Continued)

(58) Field of Classification Search
CPC ......... H04N 21/23103; H04N 21/4424; H04N 19/436; H04N 19/44; H04N 19/127
See application file for complete search history.

(56) References Cited

U.S. PATENT DOCUMENTS

| 5,754,241 A | 5/1998 | Okada et al. |
| 7,016,412 B1 * | 3/2006 | van Zon ............... H04N 19/61 375/240.1 |

(Continued)

FOREIGN PATENT DOCUMENTS

| JP | 2002-209218 A | 7/2002 |
| JP | 2010-41352 A | 2/2010 |
| KR | 10-0801630 B1 | 2/2008 |

OTHER PUBLICATIONS

Search Report dated Jan. 5, 2015, issued by the International Searching Authority in counterpart International Patent Application No. PCT/KR2014/009284 (PCT/ISA/210).
(Continued)

*Primary Examiner* — Robert J Hance
(74) *Attorney, Agent, or Firm* — Sughrue Mion, PLLC (57) ABSTRACT

A method for distributing a load, according to one embodiment, includes: identifying characteristics of each of frames included in a received bit stream; and distributing loads of a plurality of cores based on the characteristics of each of the frames whenever the frames are decoded.

21 Claims, 12 Drawing Sheets (51) Int. Cl.
*H04N 19/139* (2014.01)
*H04N 19/159* (2014.01)
*H04N 19/127* (2014.01)
*H04N 19/573* (2014.01)
*H04N 19/58* (2014.01)
*H04N 19/44* (2014.01)
*H04N 19/52* (2014.01)
*H04N 19/577* (2014.01)
*H04N 19/593* (2014.01)
*H04N 19/91* (2014.01)

(52) U.S. Cl.
CPC ......... *H04N 19/159* (2014.11); *H04N 19/172* (2014.11); *H04N 19/44* (2014.11); *H04N 19/52* (2014.11); *H04N 19/573* (2014.11); *H04N 19/577* (2014.11); *H04N 19/58* (2014.11); *H04N 19/593* (2014.11); *H04N 19/91* (2014.11)

(56) References Cited

U.S. PATENT DOCUMENTS

| | | |
|---|---|---|
| 7,796,061 B2 | 9/2010 | Kee |
| 8,548,061 B2 | 10/2013 | Suzuki |
| 9,693,071 B1* | 6/2017 | Lin ..................... H04N 19/436 |
| 2006/0059426 A1* | 3/2006 | Ogikubo .............. G11B 27/034 |
| | | 715/723 |
| 2008/0109814 A1* | 5/2008 | Park ...................... G06F 9/3851 |
| | | 718/105 |
| 2008/0189756 A1* | 8/2008 | Hsu ........................ G06F 9/505 |
| | | 725/133 |
| 2008/0288953 A1* | 11/2008 | Ando ..................... H04N 19/63 |
| | | 718/106 |
| 2008/0310555 A1* | 12/2008 | Kee ....................... G06F 9/5077 |
| | | 375/340 |
| 2008/0317121 A1* | 12/2008 | Chen .................... H04N 19/159 |
| | | 375/240.03 |
| 2008/0317138 A1 | 12/2008 | Jia |
| 2010/0080303 A1* | 4/2010 | Suzuki ................... H04N 19/44 |
| | | 375/240.25 |
| 2011/0247006 A1 | 10/2011 | Kim et al. |
| 2013/0058412 A1 | 3/2013 | Chen et al. |
| 2013/0114735 A1* | 5/2013 | Wang ................... H04N 19/176 |
| | | 375/240.23 |
| 2015/0092841 A1* | 4/2015 | Chen ...................... H04N 19/44 |
| | | 375/240.08 |

OTHER PUBLICATIONS

Written Opinion dated Jan. 5, 2015, issued by the International Searching Authority in counterpart International Patent Application No. PCT/KR2014/009284 (PCT/ISA/237).

* cited by examiner

METHOD AND DEVICE FOR DISTRIBUTING LOAD ACCORDING TO CHARACTERISTIC OF FRAME

CROSS REFERENCE TO RELATED APPLICATIONS

This application is a continuation of PCT Application No. PCT/KR2014/009284, which was filed on Oct. 1, 2014, based on Korean Patent Application No. 10-2013-0118731 filed on Oct. 4, 2013, the contents of which are incorporated herein by reference.

TECHNICAL FIELD

The present invention relates to a method and a device for distributing loads of cores included in a video decoder.

BACKGROUND ART

A video decoder is a device for decoding an input bit stream. That is, when a bit stream is input, the video decoder decodes frames included in the bit stream and outputs decoded frames.

The video decoder may include a plurality of cores. In the case of decoding the bit stream, decoding of the bit stream may be performed by segmenting the bit stream and distributing segmentations to the cores. Also, functions to be used for decoding the bit stream may be distributed to the plurality of cores. Therefore, decoding performance of the video decoder may change depending on how to distribute the functions.

DETAILED DESCRIPTION OF THE INVENTION

Technical Problem

The technical problem is to distribute loads of a plurality of cores based on characteristics of a frame.

In addition, the technical problem is to provide a computer-readable recording medium having recorded thereon a program for performing the method on a computer. The technical problem intended by the present embodiment is not limited to the above-described technical problems, and other technical problems can be inferred from the following embodiments.

Technical Solution

A method for distributing a load, according to an embodiment, includes: identifying characteristics of each of frames included in a received bit stream; and distributing loads of a plurality of cores based on the characteristics of each of the frames.

A device for distributing a load, according to an embodiment, includes: an identifier configured to identify characteristics of each of frames included in a received bit stream; and a distributor configured to distribute loads of a plurality of cores based on the characteristics of each of the frames.

Advantageous Effects of the Invention

It is possible to maintain balancing of loads of a plurality of cores by distributing the loads of the cores based on characteristics of a frame.

It is possible to distribute functions to cores by using the fact that, when each frame is decoded, calculation amounts of the functions change according to characteristics of the frame to be decoded.

It is possible to distribute functions to cores according to a type of a frame and a reference relationship between frames.

MODE OF THE INVENTION

Hereinafter, embodiments of the present invention will be described in detail with reference to the accompanying drawings.

Figure 1:
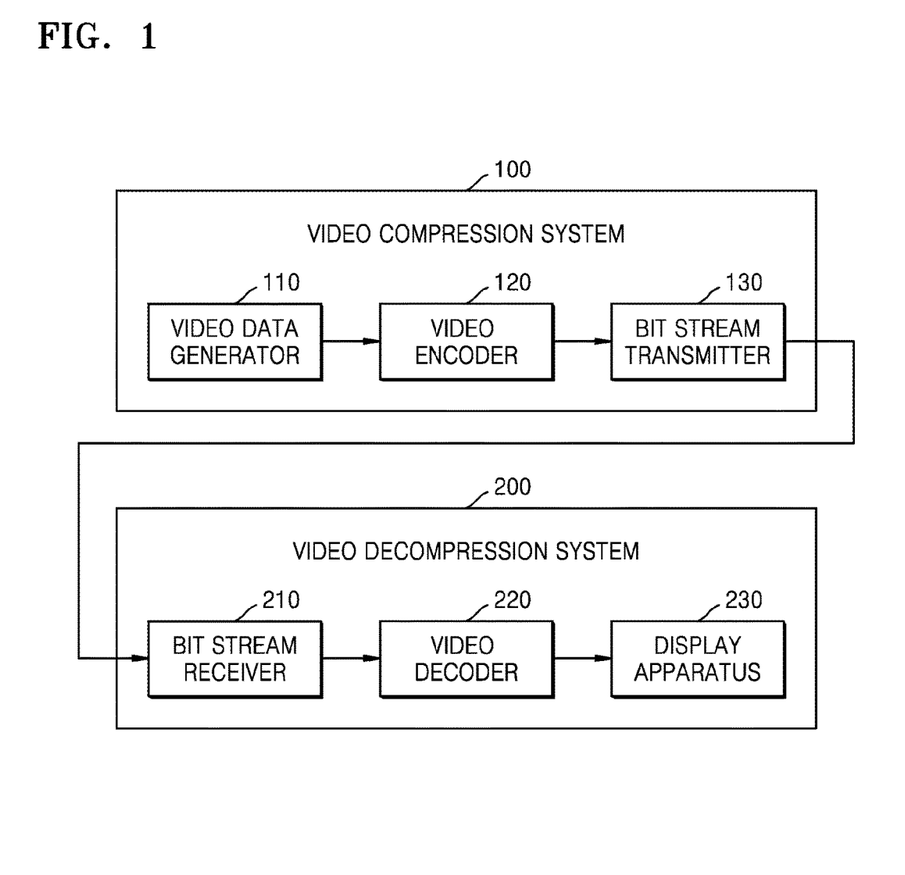
FIG. 1 is a diagram for describing video compression and video decompression.

FIG. 1 is a diagram for describing video compression and video decompression. Referring to FIG. 1, a video compression system 100 includes a video data generator 110, a video encoder 120, and a bit stream transmitter 130, and a video decompression system 200 includes a bit stream receiver 210, a video decoder 220, and a video display apparatus 230.

The video compression system 100 generates video data and compresses the generated video data before transmission. The video compression system 100 is a device for capturing a video and generating and transmitting digital data for the captured video. For example, the video compression system 100 may be an electric device, such as a computer, a camera, a mobile phone, glasses, or a watch. The glasses or the watch includes an embedded small camera capable of capturing a video, which makes it possible to capture a video and generate video data.

The video data generator 110 captures a video and generates video data. Also, the video data generator 110 may receive video data from a server or another electric device.

The video data generator 110 outputs the generated video data to the video encoder 120.

The video data generator 110 may be a camera capable of capturing an image or a moving image.

The video encoder 120 receives the video data from the video data generator 110.

The video encoder 120 encodes the received video data. That is, the video encoder 120 compresses the video data so as to reduce the amount of the video data. The video encoder 120 performs transformation of the video data and generates transformed video data.

The video encoder 120 quantizes the transformed video data. The video encoder 120 generates a bit stream by using the quantized video data.

The video encoder 120 outputs the generated bit stream to the bit stream transmitter 130.

The video encoder 120 may be implemented by one or more processors. Also, the video encoder 120 may be a type of a program embedded in a processor.

The bit stream transmitter 130 receives the bit stream from the video encoder 120 and transmits the received bit stream to the video decompression system 200. The bit stream transmitter 130 may transmit the bit stream to the video decompression system 200 in a wireless or wired manner.

The video decompression system 200 generates video data by decoding the bit stream and displays a video by using the generated video data. The video decompression system 200 may decode an encoded bit stream and provide a moving image to a user. For example, the video decompression system 200 may be an electric device, such as a television (TV), a computer, a camera, a mobile phone, glasses, or a watch. The camera, the glasses, or the watch includes a display apparatus capable of displaying a moving image and provides the moving image to the user.

The bit stream receiver 210 receives a bit stream from the video compression system 100 and transmits the received bit stream to the video decoder 220. The bit stream receiver 210 may receive the bit stream from the video compression system 100 in a wireless or wired manner.

The video decoder 220 receives the bit stream from the bit stream receiver 210. The video decoder 220 decodes the received bit stream. That is, the video decoder 220 generates video data by decompressing a compressed bit stream. The video decoder 220 generates two-dimensional (2D) data by using the received bit stream and generates video data by performing inverse transform and inverse quantization, and the like on the generated 2D data.

The video decoder 220 may include a load distribution device for distributing loads of cores based on characteristics of a frame. Therefore, the load distribution device is capable of improving performance of the video decoder 220 by controlling the loads of the cores. The load distribution device will be described in detail below with reference to FIG. 2.

The video decoder 220 outputs generated video data to the display apparatus 230.

The display apparatus 230 displays the video data received from the video decoder 220.

The display apparatus 230 represents a screen of a TV or mobile phone, or the like. For example, the display apparatus 230 may be implemented in the form of a liquid crystal display (LCD), a plasma display panel, an organic electroluminescence panel, or the like.

Figure 2:
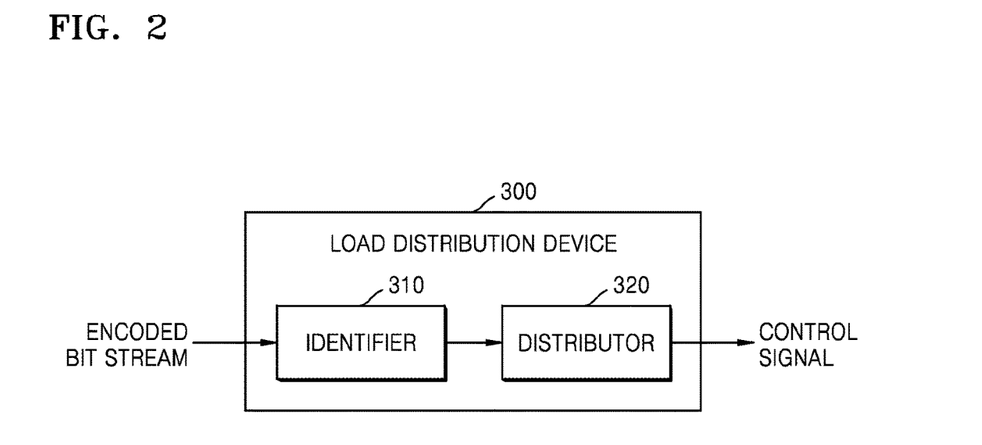
FIG. 2 is a diagram for describing a load distribution device according to an embodiment.

FIG. 2 is a diagram for describing a load distribution device 300 according to an embodiment. Referring to FIG. 2, the load distribution device 300 includes an identifier 310 and a distributor 320.

The identifier 310 receives an encoded bit stream and identifies characteristics of a frame included in the received bit stream. The identifier 310 may identify a type of the frame as the characteristics of the frame. For example, the type of the frame may be an I-type frame, a P-type frame, or a B-type frame. The I-type frame is an intra frame. The P-type frame and the B-type frame are inter frames. The P-type frame is a frame encoded by referring to the I-type frame, and the B-type frame is a frame encoded by referring to the I-type frame and the P-type frame. The B-type frame may be encoded by referring to another B-type frame. That is, the B-type frame may be encoded by referring to the I-type frame and another B-type frame, or may be encoded by referring to another B-type frame and the P-type frame.

Also, the identifier 310 may identify a reference relationship of the frame based on the characteristics of the frame. The reference relationship indicates which frame among neighboring frames is referred to by the frame. For example, the reference relationship may be information indicating relative positions of a frame to be encoded and a reference frame. That is, a frame referred to when the video encoder 120 encodes a certain frame is referred to as a "reference frame". The video encoder 120 performs encoding by using residual data indicating a difference between the reference frame and the frame to be encoded.

The identifier 310 may identify a picture order count (POC) based on the characteristics of the frame. An examples of the reference relationship may be the POC. The POC is information indicating a position of a frame, and represents a relative position of the frame with respect to the reference frame with numeral values.

An encoded bit stream includes pieces of information about the characteristics of the frame as described above. That is, the bit stream includes the data indicating the type of the frame, the data indicating the reference relationship of the frame, the data indicating the POC, and the like.

The bit stream includes information about the characteristics of the frame with respect to each frame. Therefore, the identifier 310 may identify information about characteristics of each frame.

The identifier 310 outputs the information about the characteristics of the frame to the distributor 320.

The distributor 320 distributes loads of cores based on the characteristics of the frame received from the identifier 310. The distributor 320 distributes a load to the cores based on different characteristics of frames. Specifically, the distributor 320 distributes functions to be performed in the cores based on the characteristics of the frames. The functions to be performed in the cores refer to functions to be used in decoding of the bit stream. Examples of the functions may include a variable length decoding (VLD) function, a prediction function, an inverse quantization function, inverse transform function, a deblock function, and a sample adaptive offset (SAO) function.

The distributor 320 may distribute the functions according to the types of the frames. That is, the distributor 320 distributes the functions to the cores depending on whether the frame is an I-type frame, a P-type frame, or a B-type frame. For example, when an input frame is the I-type frame, the calculation amount of the VLD function increases. Therefore, the distributor 320 may distribute only the VLD function to a first core. Alternatively, the distributor 320 may distribute the VLD function to a core having the most excellent performance.

When the input frame is the P-type frame or the B-type frame, the calculation amount of the prediction function increases. Therefore, the distributor 320 may distributes only the prediction function to a certain core. Also, the distributor 320 may distribute the functions depending on whether the frame is an intra frame or an inter frame.

The distributor 320 may distribute the functions based on the reference relationship. The distributor 320 may distribute the functions in consideration of the POC of the frame. For example, the distributor 320 may distribute the functions according to a case in which the POC is equal to or larger than a reference value and a case in which the POC is smaller than the reference value. The reference value may be determined based on the calculation amounts of the functions changed according to a value of the POC. For example, the reference value may be determined as an average value of POCs.

The distributor 320 may distribute the functions in consideration of both the type and reference relationship of the frame. For example, the distributor 320 may distribute the functions according to a case in which the frame is the P-type frame and the POC is equal to or larger then the reference value and a case in which the frame is the P-type frame and the POC is smaller than the reference value. The reference value for classifying a size of the POC may include one or more values.

The distributing of the functions as described above is merely an example, and a policy or a rule by which the distributor 320 distributes the functions may differ according to the type of the frame and performance of the cores. That is, the functions to be distributed by the distributor 320 are different according to a case in which the cores have the same performance and a case in which the cores have different performance. The functions to be distributed to the cores are previously determined based on the types of the frame, the POC, and performance of the cores. Therefore, the load distribution device 300 distributes the functions to predetermined cores when the type of the frame and the POC are identified.

The distributor 320 controls the cores so as to perform decoding based on the loads distributed to the cores by transmitting the control signal to the cores.

The distributor 320 stores programs and data for the functions in memories of the cores. For example, when the distributor 320 distributes a function A to a first core, the distributor 320 stores a program A and data A corresponding to a function A in a memory of the first core.

The distributor 320 may control exchange of the programs and the data between the cores. That is, the distributor 320 may perform control so as to exchange the programs and the data with one another and store the programs and the data in the memories of the core.

Figure 3:
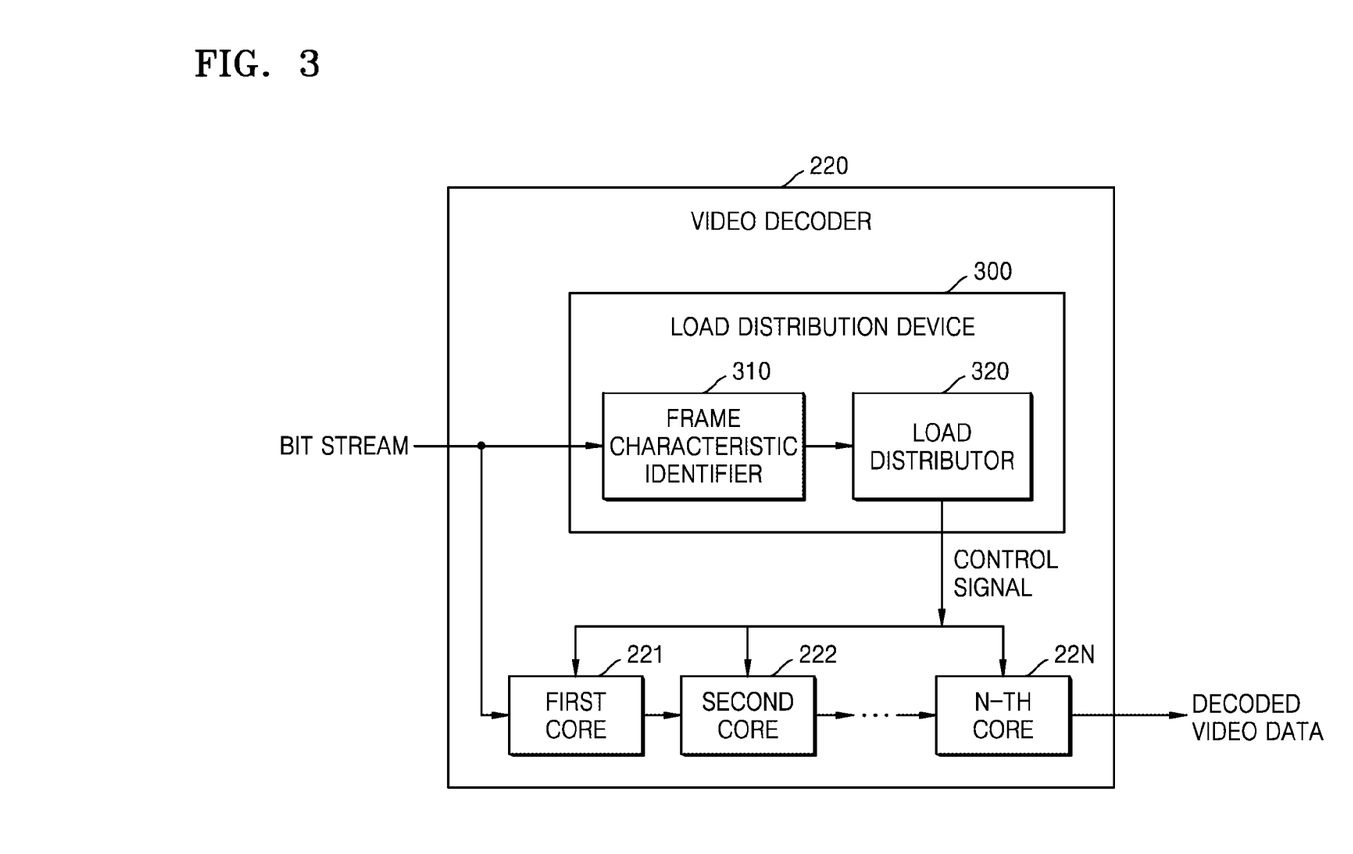
FIG. 3 is a diagram for describing an example in which a load distribution device distributes a load to a plurality of cores.

FIG. 3 is a diagram for describing an example in which the load distribution device 300 distributes a load to a plurality of cores 221 to 22N. Referring to FIG. 3, the video decoder 220 includes the load distribution device 300 and the plurality of cores 221 to 22N.

The load distribution device 300 receives a bit stream and outputs a control signal to the cores 221 to 22N. That is, the load distribution device 300 outputs the control signal to the cores based on characteristics of frames included in the bit stream.

The load distribution device 300 may re-distribute a load for each of the frames. That is, the load distribution device 300 re-distribute the load according to the characteristics of the frames which are input subsequently. Therefore, functions to be performed in the cores 221 to 22N may differ for each of the frames.

The cores 221 and 22N perform decoding of the frame according to the received control signal. That is, the cores 221 to 22N perform decoding of the bit stream by performing the functions distributed according to the control signal. The bit stream is decoded by passing through the first core 221 to the N-th core 22N. The N-th core 22N outputs decoded video data.

Figure 4:
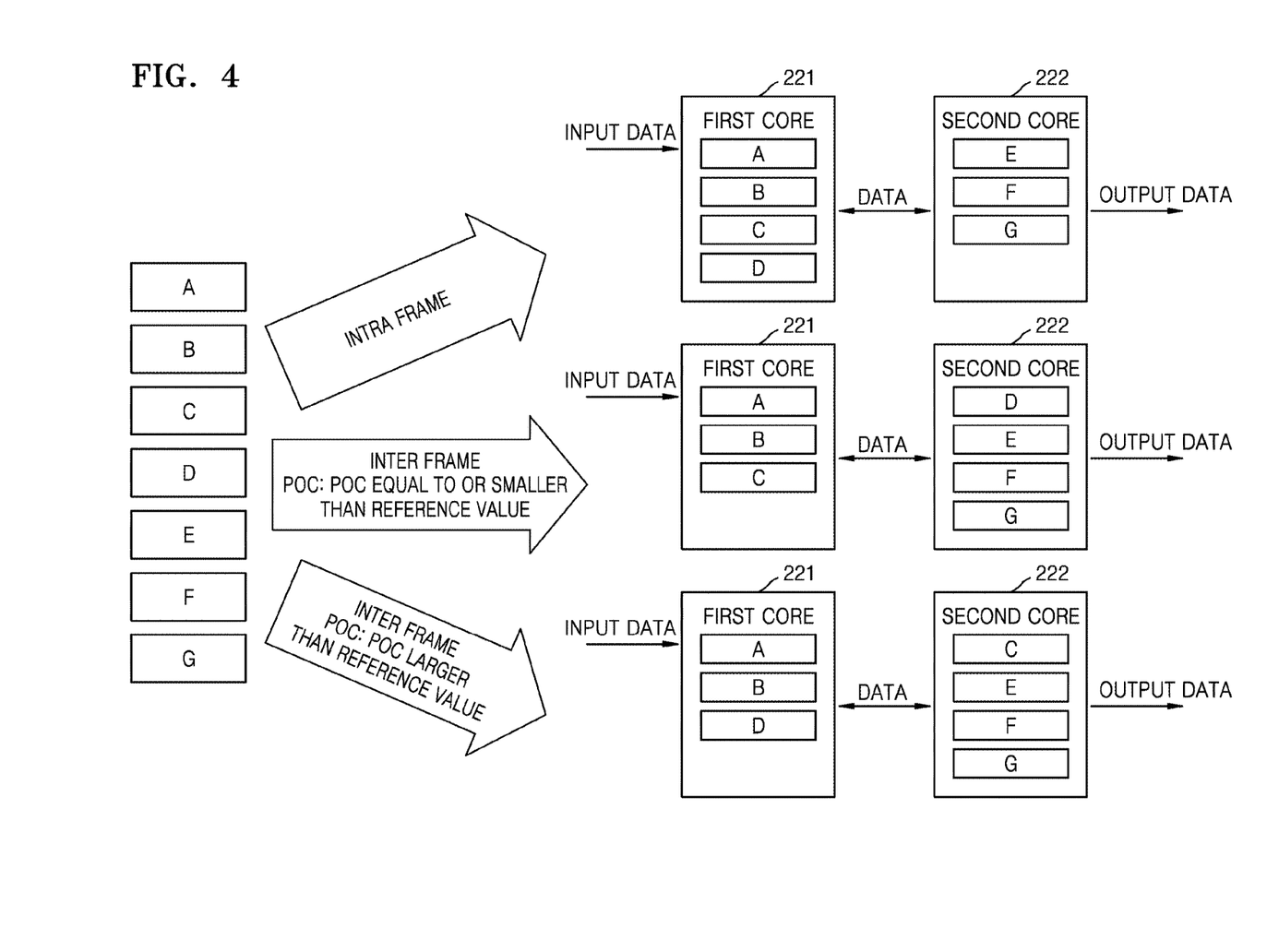
FIG. 4 is a diagram for describing an example in which a load distribution device distributes functions based on a type of frame and a picture order count (POC).

FIG. 4 is a diagram for describing an example in which the load distribution device 300 distributes the functions based on the type of a frame and a POC. Referring to FIG. 4, the load distribution device 300 distributes the functions A to G to the first and second cores 221 and 222 based on the type of the frame and the POC. The functions A to G are functions to be performed in decoding of the bit stream.

FIG. 4 illustrates a case in which the type of a frame is an intra frame, a case in which the type of a frame is an inter frame and the POC is equal to or smaller than a reference value, and a case in which the type of a frame is the intra frame, and the POC is larger than the reference value. The first core 221 receives input data, performs distributed functions, and outputs the data to the second core 222. The second core 22 receives the data, performs distributed functions, and generate output data.

The load distribution device 300 distributes functions A to G to the cores 221 and 222 in consideration of calculation amounts of functions to be performed based on the type of the frame and the POC. FIG. 4 illustrates an example in which the functions are distributed to the first and second cores 221 and 222. Therefore, the load distribution device 300 may distributes the functions to the cores by another combination, in consideration of the type of the frame, the POC, and performance of the cores.

When the type of the frame is an intra frame, the load distribution device 300 allocates the functions A to D to the first core 221, and the functions E to G to the second core 222.

When the type of the frame is an inter frame and the POC is equal to or smaller than the reference value, the load distribution device 300 allocates the functions A to C to the first core 221, and the functions D to G to the second core 222.

When the type of the frame is the inter frame and the POC is larger than the reference value, the load distribution device 300 allocates the functions A, B, and D to the first core 221, and the functions C and E to G to the second core 222.

Figure 5:
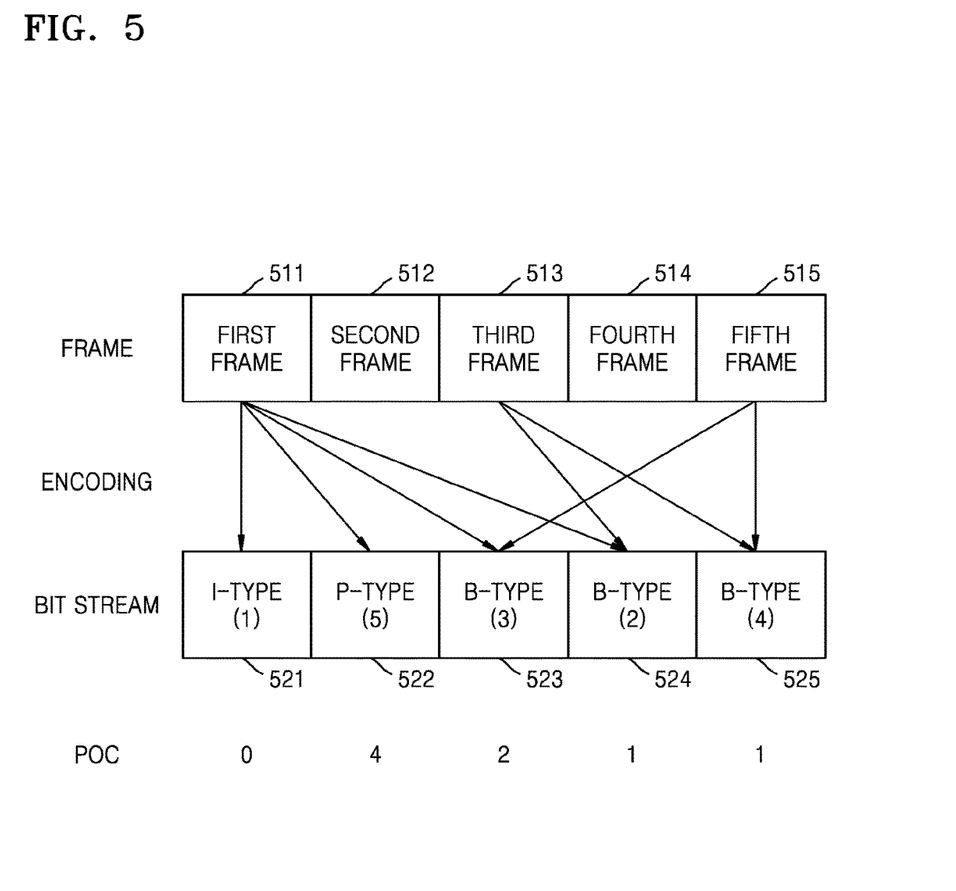
FIG. 5 is a diagram for describing a type of a frame and a POC.

FIG. 5 is a diagram for describing a type of a frame and a POC. Referring to FIG. 5, frames 511 to 515 are frames before being encoded. A bit stream indicates data including encoded frames. The POC indicates a position relationship between the encoded frames. Numbers in brackets under frames 521 to 525 indicate frame numbers before encoding. That is, the order of frames before encoding may be different from the order of frames included in the bit stream.

An I-type frame 521 is a frame obtained by encoding the first frame 511 through intra prediction. The I-type frame 521 has a POC of 0 because there is no reference frame.

A P-type frame 522 is a frame obtained by encoding the fifth frame 515 through inter prediction. Since the P-type frame 522 is encoded by referring to the first frame 511, a distance between the first frame 511 and the fifth frame 515 is 4, and therefore, the POC is calculated as 4.

A B-type frame 523 is a frame obtained by encoding the third frame 513 through inter prediction. Since the B-type frame 523 is encoded by referring to the first frame 511 and the fifth frame 515, a distance between the third frame 513 and the first frame 511 is 2, and a distance between the third frame 513 and the fifth frame 515 is 2, and therefore, the POC is calculated as 2 that is the average value thereof. In the case of referring to a plurality of frames, the POC may be calculated by various methods, such as a method of using the minimum value and a method of using the maximum value, in addition to a method of using the average value.

A B-type frame 524 is a frame obtained by encoding the second frame 512 through inter prediction. Since the B-type frame 524 is encoded by referring to the first frame 511 and the third frame 513, a distance between the second frame 512 and the first frame 511 is 1, and a distance between the second frame 512 and the third frame 513 is 1, and therefore, the POC is calculated as 1 that is the average value thereof.

A B-type frame 525 is a frame obtained by encoding the fourth frame 514 through inter prediction. Since the B-type frame 525 is encoded by referring to the third frame 513 and the fifth frame 515, a distance between the fourth frame 514 and the third frame 513 is 1, and a distance between the fourth frame 514 and the fifth frame 515 is 1, and therefore, the POC is calculated as 1 that is the average value thereof.

Figure 6:
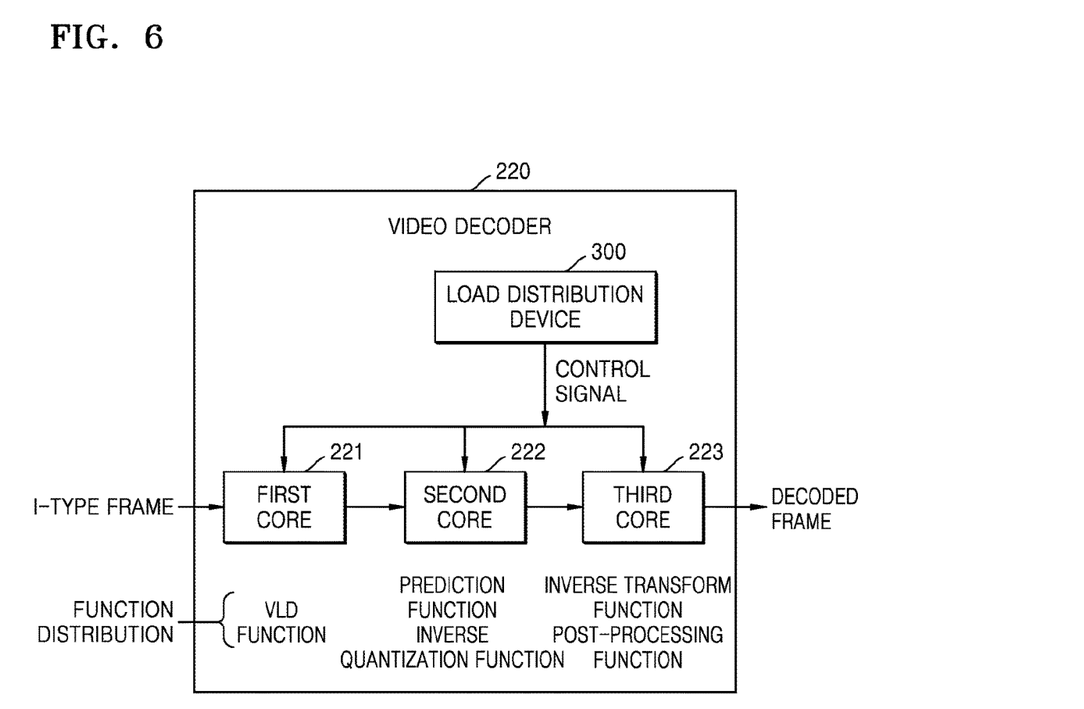
FIG. 6 is a diagram for describing an example in which a load distribution device distributes functions to cores.

FIG. 6 is a diagram for describing an example in which the load distribution device 300 distributes functions to cores. Referring to FIG. 6, the video decoder 220 receives an I-type frame and outputs a decoded frame. In this case, the load distribution device 300 distributes the functions to first to third cores 221 to 223 according to characteristics of the I-type frame. That is, the load distribution device 300 distributes the functions to the cores 221 to 223 in consideration of calculation amounts of functions for performing decoding of the I-type frame. For example, the load distribution device 300 distributes only a VLD function to the first core 221, a prediction function and an inverse quantization function to the second core 222, and an inverse transform function and a post-processing function to the third core 223.

Figure 7:
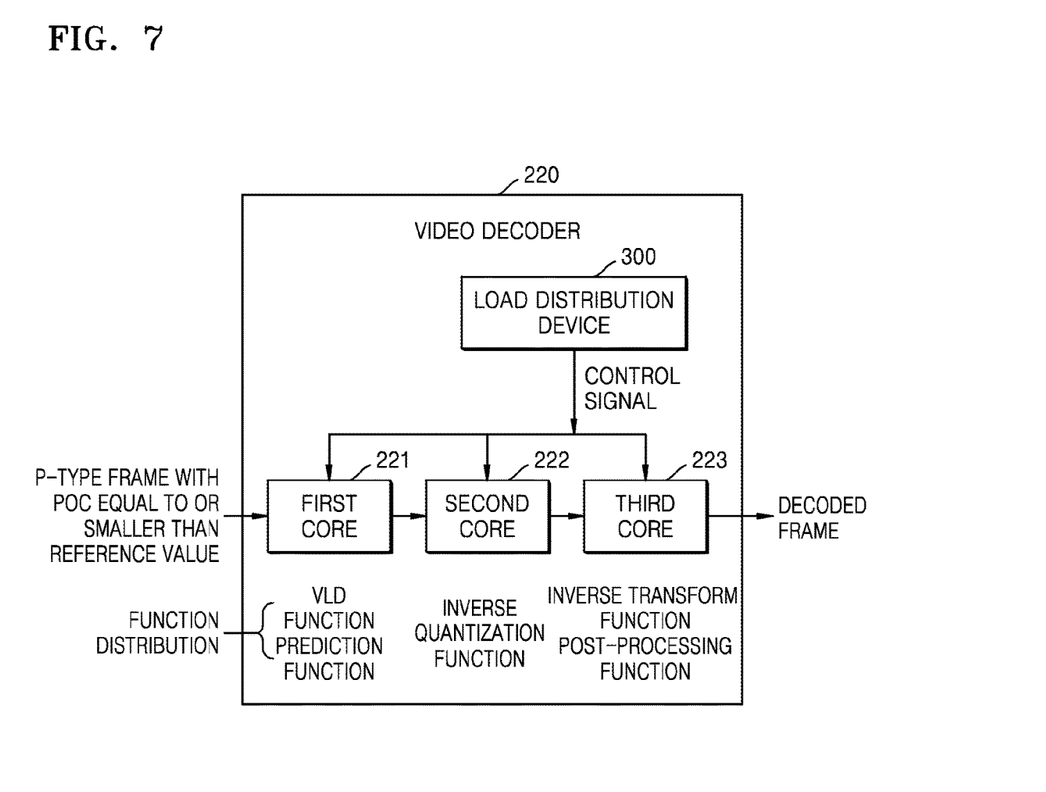
FIG. 7 is a diagram for describing an example in which a load distribution device distributes functions to cores.

FIG. 7 is a diagram for describing an example in which the load distribution device 300 distributes functions to cores. Referring to FIG. 7, the video decoder 220 receives a P-type frame with a POC equal to or smaller than a reference value and outputs a decoded frame. In this case, the load distribution device 300 distributes the functions to the first to third cores 221 to 223 according to characteristics of the P-type frame with the POC equal to or smaller than the reference value. That is, the load distribution device 300 distributes the functions to the cores 221 to 223 in consideration of calculation amounts of functions for performing decoding of the P-type frame with the POC equal to or smaller than the reference value. For example, the load distribution device 300 may distribute a VLD function and a prediction function to the first core 221, an inverse quantization function to the second core 222, and an inverse transform function and a post-processing function to the third core 223.

Figure 8:
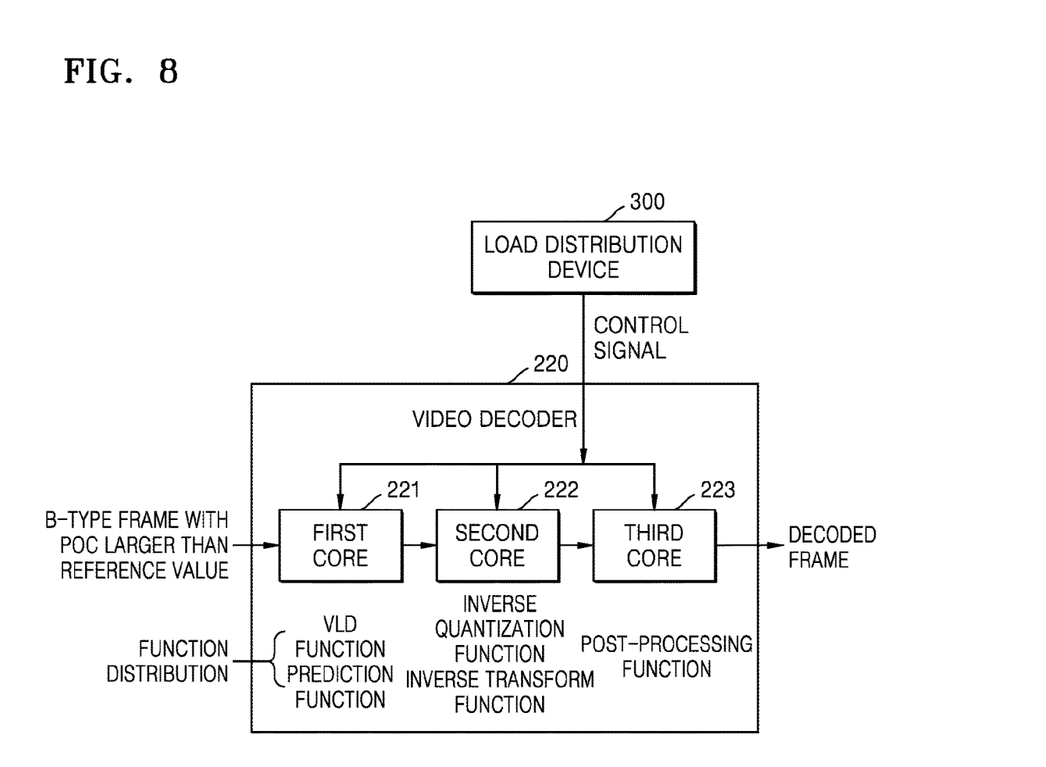
FIG. 8 is a diagram for describing an example in which a load distribution device distributes functions to cores.

FIG. 8 is a diagram for describing an example in which the load distribution device 300 distributes functions to cores. Referring to FIG. 8, the video decoder 220 receives a B-type frame with a POC larger than a reference value and outputs a decoded frame. In this case, the load distribution device 300 distributes the functions to the first to third cores 221 to 223 according to characteristics of the B-type frame with the POC larger than the reference value. That is, the load distribution device 300 distributes the functions to the cores 221 to 223 in consideration of calculation amounts of functions for performing decoding of the B-type frame with the POC larger than the reference value. For example, the load distribution device 300 may distribute a VLD function and a prediction function to the first core 221, an inverse quantization function and an inverse transform function to the second core 222, and a post-processing function to the third core 223.

Figure 9A:
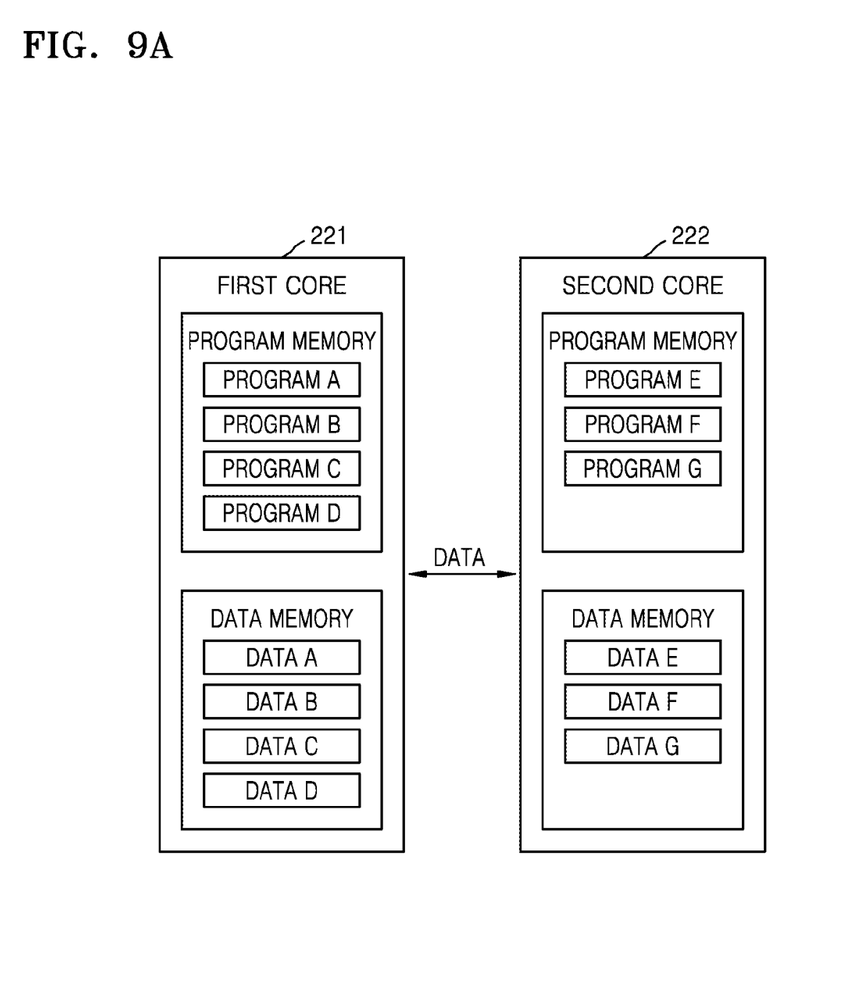
FIGS. 9A to 9C are diagrams for describing an example of managing memories of cores according to characteristics of a frame.
Figure 9B:
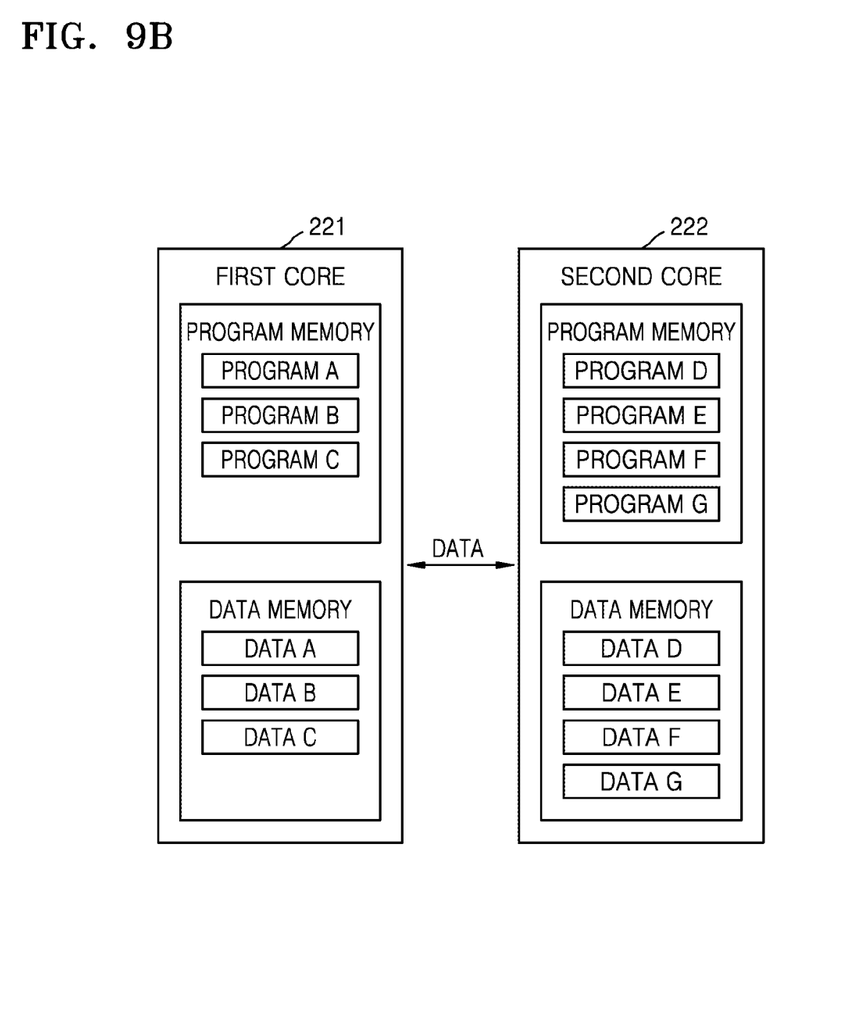
Figure 9C:
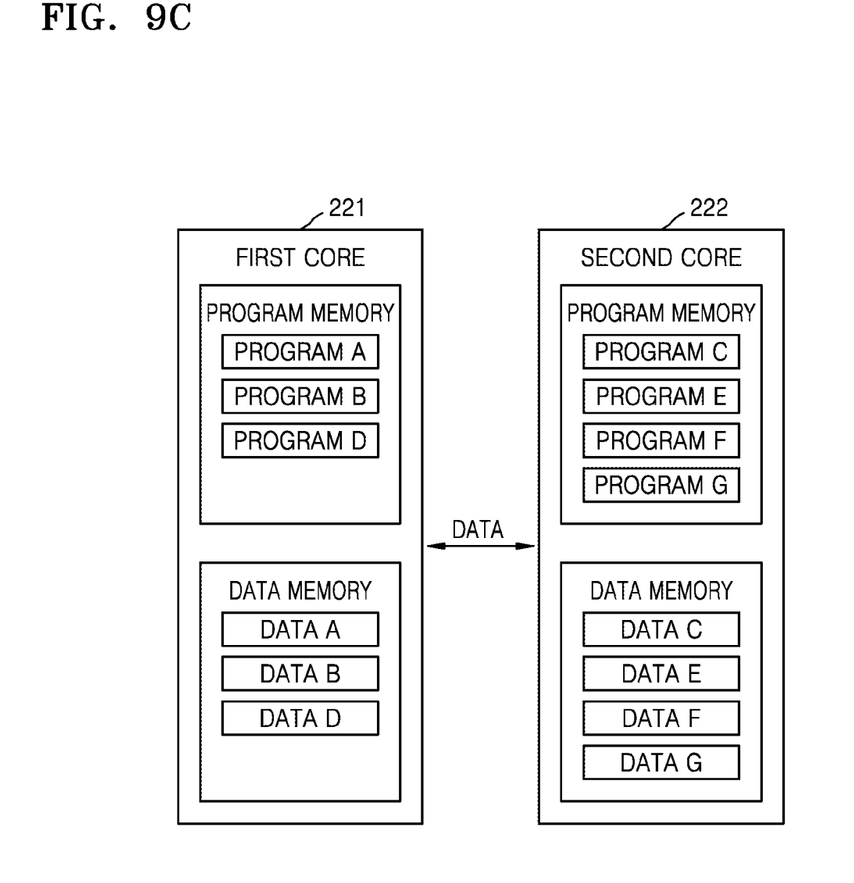

FIGS. 9A to 9C are diagrams for describing an example of managing memories of cores according to characteristics of a frame. Referring to FIGS. 9A to 9C, programs and data stored in memories of cores 221 and 222 may differ according to a control signal from the load distribution device 300. That is, the load distribution device 300 distributes the programs and the data to be stored in the cores 221 and 222 based on the characteristics of the frame. Two cores are illustrated in FIGS. 9A and 9C. However, even when two or more cores are used, programs and data are stored in the memories of the cores 221 and 222 according to functions distributed to the cores.

The programs and the data may be stored in a memory outside the cores 221 and 222 before being stored in the memories of the cores 221 and 222.

The cores 221 and 222 may transmit and receive the programs and the data to and from each other. Therefore, whenever the frames are changed, the cores 221 and 222 may exchange the programs and the data with each other according to distributed functions, and store the programs and the data in the memories of the cores 221 and 222. For example, a program D and data D stored in the first core 221 in FIGS. 9A and 9B may be transmitted to the second core 222 and may be stored in the memory of the second core 222.

Referring to FIG. 9A, when the load distribution device 300 distributes functions A to D to the first core 221, pieces of data associated with the functions A to D are stored in an internal memory of the first core 221. That is, programs of the functions A to D (program A to program D) are stored in a program memory of the first core 221. That is, pieces of data (data A to data D) of the functions A to D are stored in a data memory of the first core 221.

Also, pieces of data associated with functions E to G are stored in an internal memory of the second core 222. That is, programs of the functions E to G (program E to program G) are stored in a program memory of the second core 222. Pieces of data of the functions E to G (data E to data G) are stored in a data memory of the second core 222.

The first core 221 and the second core 222 may transmit and receive the programs and the data, which are stored in the first core 221 and the second core 222, to and from each other. Therefore, when the functions distributed to the first core 221 and the second core 222 are changed, the first core 221 and the second core 222 may transmit and receive the programs and the data to and from each other according to the distributed functions.

Referring to FIG. 9B, when the load distribution device 300 distributes the functions A to C to the first core 221, pieces of data associated with the functions A to C are stored in the internal memory of the first core 221. That is, programs of the functions A to C (program A to program C) are stored in the program memory of the first core 221. Pieces of data of the functions A to C (data A to data C) are stored in the data memory of the first core 221.

Also, pieces of data associated with the functions D to G are stored in the internal memory of the second core 222. That is, programs of the functions D to G (program D to program G) are stored in the program memory of the second core 222. Pieces of data of the functions D to G (data D to data G) are stored in the data memory of the second core 222.

Referring to FIG. 9C, when the load distribution device 300 distributes the functions A, B, and D to the first core 221, pieces of data associated with the functions A, B, and D are stored in the internal memory of the first core 221. That is, programs A, B, and D of the functions A, B, and D (program A, program B, and program D) are stored in the program memory of the first core 221. Pieces of data of the functions A, B, and D (data A, data B, and data D) are stored in the data memory of the first core 221.

Also, pieces of data associated with the functions C and E to G are stored in the internal memory of the second core 222. That is, programs of the functions C and E to G (program C and program E to program G) are stored in the program memory of the second core 222. Pieces of data of the functions C and E to G (data C and data E to data G) are stored in the data memory of the second core 222.

Figure 10:
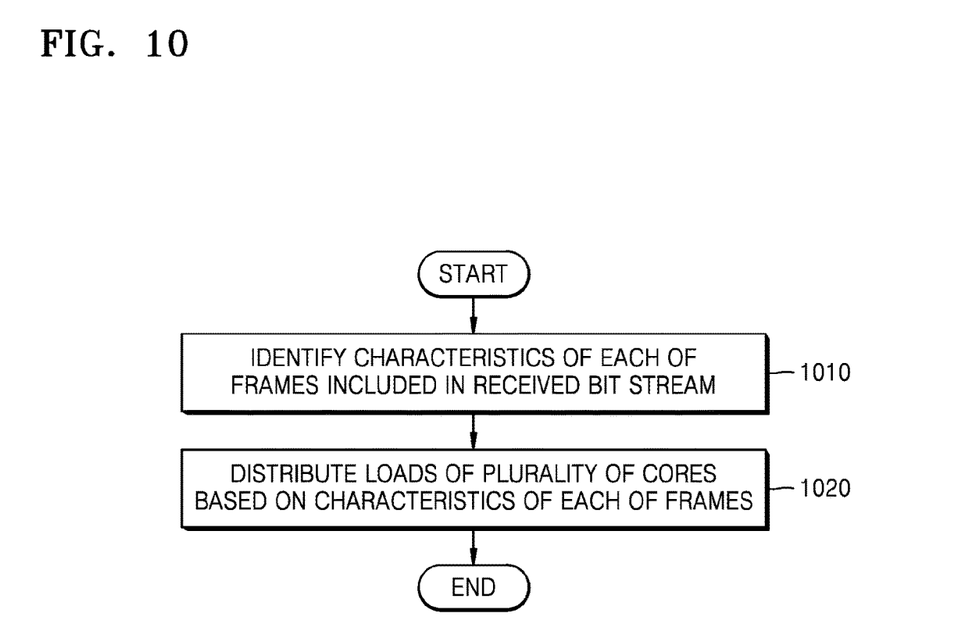
FIG. 10 is a flowchart of a method of distributing a load, according to an embodiment.

FIG. 10 is a flowchart of a method of distributing a load, according to an embodiment. Referring to FIG. 10, in operation 1010, the load distribution device 300 identifies characteristics of each of frames included in a received bit stream. The load distribution device 300 identifies the characteristics of each of the frames whenever the frame is received.

In operation 1020, the load distribution device 300 distributes loads of a plurality of cores based on the characteristics of each of the frames. The load distribution device 300 re-distribute the loads of the cores whenever the frame is received.

The load distribution device 300 distributes the loads of the cores according to characteristics of a received frame whenever the frame is received, efficiently performing balancing of the loads to be distributed to the cores.

The above-described method may be implemented by a program that is executable on a computer and may be implemented in a general-purpose digital computer that operates the program by using a computer-readable recording medium. In addition, the data structures used in the above-described method may be recorded in the computer-readable recording medium through various manners. The computer-readable recording medium includes a magnetic storage medium (for example, ROM, RAM, USB, floppy disk, a hard disk, or the like), an optical readable medium (for example, CD-ROM, DVD, or the like).

The invention claimed is:

1. A method for distributing a load, the method comprising:
identifying characteristics of each of frames included in a received bit stream; and
distributing loads of a plurality of cores based on the characteristics of each of the frames whenever the frames are decoded,
wherein the identifying comprises identifying a reference relationship between the frames included in the bit stream, and
wherein the reference relationship is distance information indicating a relative distance between a first frame to be encoded and a second frame, which is a reference frame, in a sequential picture order of the frames included in the received bit stream.

2. The method of claim 1, wherein
the identifying comprises identifying types of the frames, and
the distributing comprises distributing the loads according to the types of the frames.

3. The method of claim 1, wherein
the identifying comprises identifying types of the frames according to whether the frame is one of an I-type frame, a P-type frame and a B-type frame, and
the distributing comprises distributing the loads according to the types of the frames.

4. The method of claim 1, wherein
the distributing comprises distributing the loads in consideration of the reference relationship.

5. The method of claim 1, wherein
the identifying comprises identifying types of the frames and the reference relationship between the frames included in the bit stream, and
the distributing comprises distributing the loads in consideration of the types of the frames and the reference relationship.

6. The method of claim 1, wherein
the distributing comprises distributing functions to be performed in the cores to the cores when the bit stream is decoded.

7. The method of claim 6, wherein
the distributing comprises storing programs and data for the functions in memories of the cores.

8. The method of claim 7, wherein
the storing comprises exchanging the programs and the data between the cores and storing the programs and the data in the memories of the cores.

9. The method of claim 1, wherein the distance information is a Picture Order Count (POC) value indicating a relative position of the first frame with respect to the second frame determined based on the distance between the frame and the second frame.

10. The method of claim 9, wherein the distributing loads of the plurality of cores based on the characteristics of each of the frames whenever the frames are decoded comprises:
comparing the POC value of the first frame with a reference value; and
distributing loads of the plurality of cores based on a result of the comparing the POC value of the first frame with the reference value.

11. The method of claim 10, wherein when a type of the first frame is an inter frame and the POC value is equal to or smaller than the reference value, distributing a first operation to be performed corresponding to the first frame to a first core, among the plurality of cores; and
when the type of the first frame is an inter frame and the POC value is larger than the reference value, distributing a first operation to be performed corresponding to the first frame to a second core, among the plurality of cores.

12. A device for distributing a load, the device comprising:
a processor, wherein the processor is configured to:
identify characteristics of each of frames included in a received bit stream; and
distribute loads of a plurality of cores based on the characteristics of each of the frames whenever the frames are decoded,
wherein the processor is further configured to identify a reference relationship between the frames included in the bit stream, and
wherein the reference relationship is distance information indicating a relative distance between a first frame to be encoded and a second frame, which is a reference frame, in a sequential picture order of the frames included in the received bit stream.

13. The device of claim 12, wherein
the processor is further configured to:
identify types of the frames, and
distribute the loads according to the types of the frames.

14. The device of claim 12, wherein
the processor is further configured to:
identify types of the frames according to whether the frames is one of an I-type frame, a P-type frame and a B-type frame, and
distribute the loads according to the types of the frames.

15. The device of claim 12, wherein
the processor is further configured to:
distribute the loads according to the reference relationship.

16. The device of claim 12, wherein
the processor is further configured to:
- identify types of the frames and the reference relationship between the frames included in the bit stream, and
- distribute the loads according to the types of the frames and the reference relationship.

17. The device of claim 12, wherein
the processor is further configured to:
distribute functions to be performed in the cores to the cores when the bit stream is decoded.

18. The device of claim 17, wherein
the processor is further configured to:
store programs and data for the functions in memories of the cores.

19. The device of claim 18, wherein
the processor is further configured to:
exchange the programs and the data between the cores and storing the programs and the data in the memories of the cores.

20. The device of claim 12, wherein
the processor is further configured to:
- identify a first characteristic of a first frame, among frames included in the received bit stream;
- identify a second characteristic of a second frame, among the frames included in the received bit stream; and
- distribute the loads of the plurality of cores based on the first and second characteristics of each of the first and second frames by:
  - distributing a first operation to be performed corresponding to the first frame to a first core, among the plurality of cores, based on the first characteristic of the first frame; and
  - distributing a second operation to be performed corresponding to the second frame to a second core, among the plurality of cores, based on the second characteristic of the second frame.

21. A non-transitory computer-readable recording medium having recorded thereon a program that, when executed by a computer, causes the computer to perform the method of claim 1.

* * * * *